Figure 4:
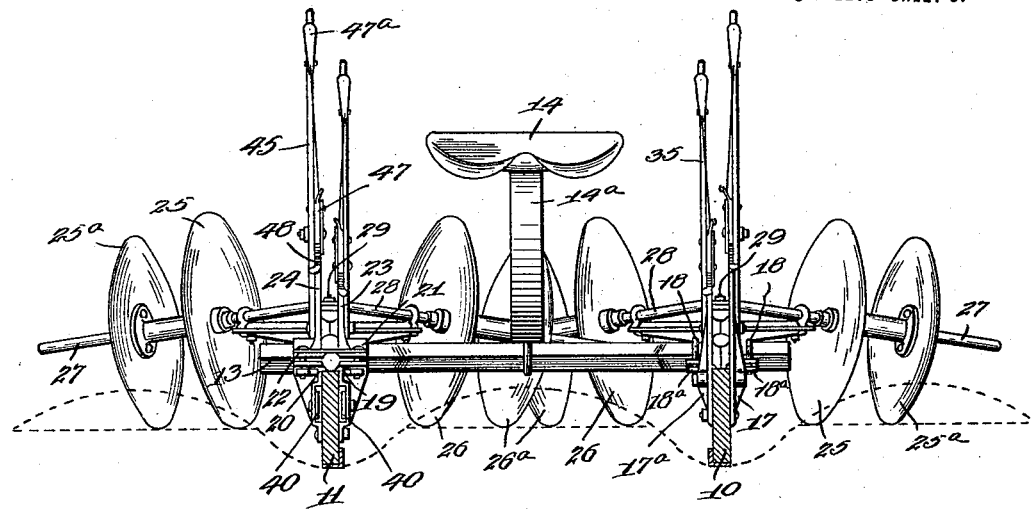

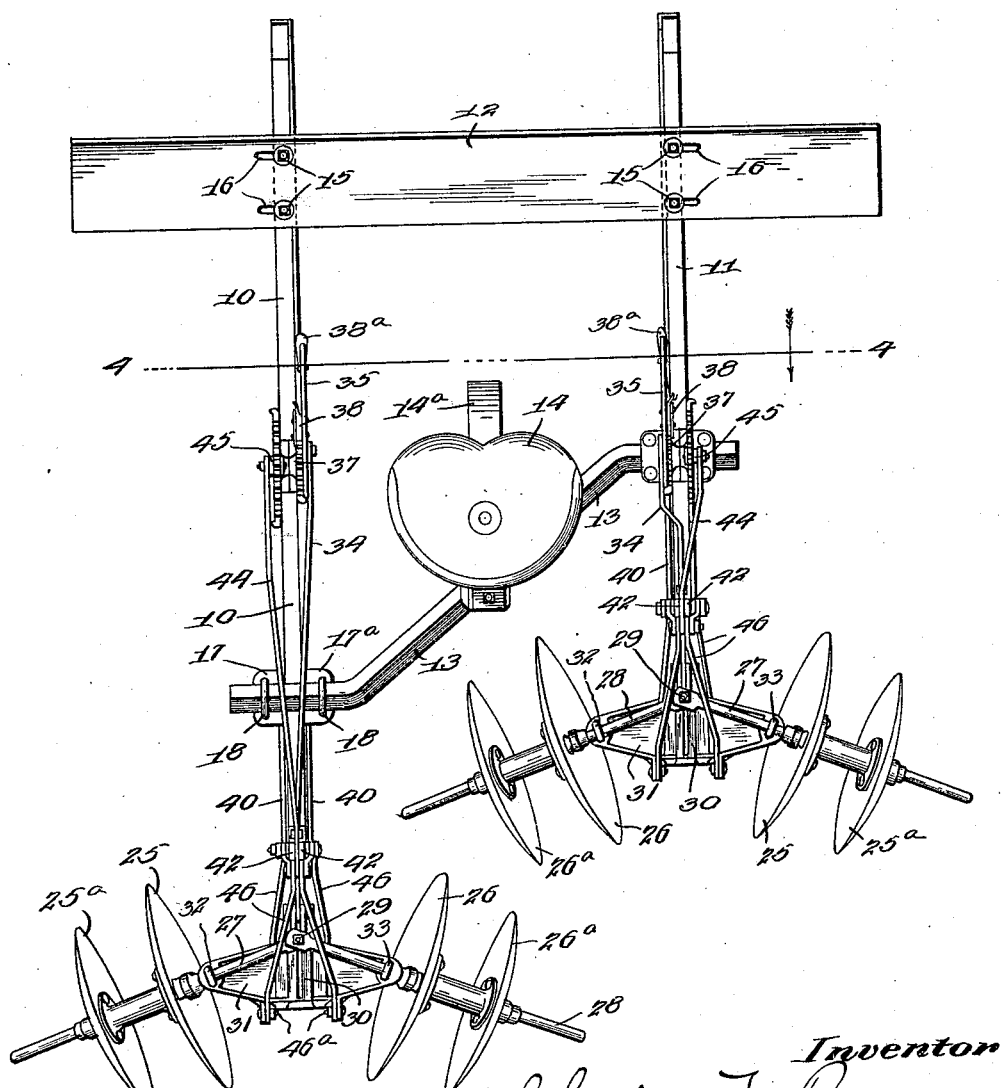

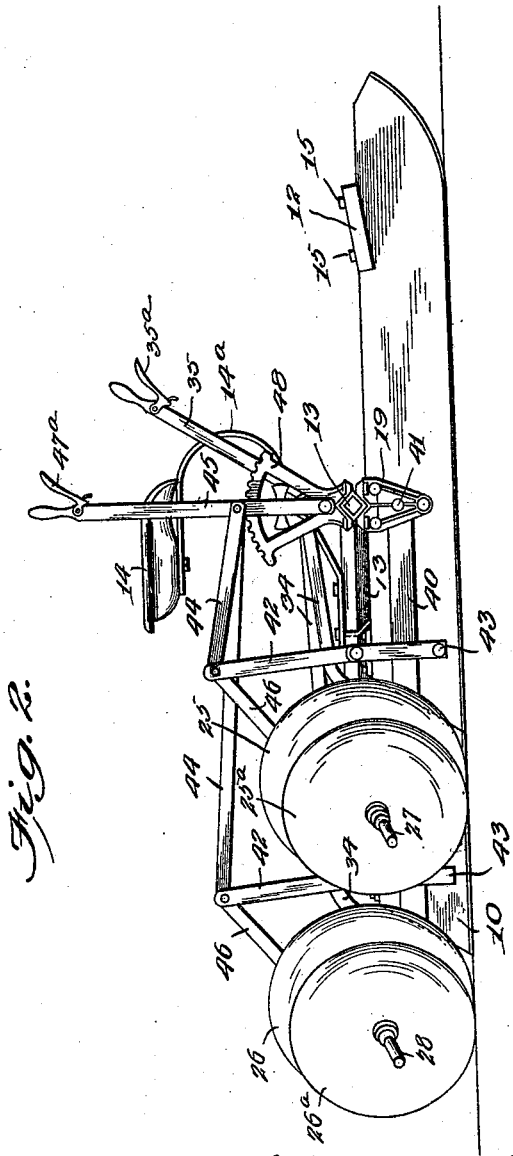

UNITED STATES PATENT OFFICE.

CHARLES T. RAY, OF LOUISVILLE, KENTUCKY, ASSIGNOR TO B. F. AVERY AND SONS, OF LOUISVILLE, KENTUCKY, A CORPORATION OF KENTUCKY.

RIDGE BREAKER.

1,412,135. Specification of Letters Patent. Patented Apr. 11, 1922.

Application filed May 16, 1919. Serial No. 297,508.

*To all whom it may concern:*

Be it known that I, CHARLES T. RAY, a citizen of the United States, residing at Louisville, in the county of Jefferson and State of Kentucky, have invented certain new and useful Improvements in Ridge Breakers, of which the following is a specification.

In certain dry sections of the country it has been customary, in order to conserve the rainfalls, between harvest and replanting, to produce furrows about three feet apart by means of a middle burster, or double moldboard plow, the soil from the furrows being thrown up by the plows into "ridges" between the furrows. These ridges are left for a greater or lesser period of time and are then thrown back into the furrows by means of ridge breakers or "ridge busters" previous to replanting, or replowing the soil for replanting. The ridge breakers which have been proposed are of two different types, to wit, single row and double row, respectively. In the so-called double row ridge breakers hitherto proposed, the runners employed to support the implement have been so correlated as to traverse the same furrow or trench in the same travel of the implement and the disks usually employed to break the ridges, i. e., return the loose soil of which they have been formed to the furrows from which they came, have consisted of two forward pairs of disks and two rearward pairs of disks. In the operation of the implement, its successive travels are in alternate furrows. The two forward pairs of disks are adjustably mounted on a transverse shaft or supporting bar and are arranged on opposite sides of the pairs of runners and are set to throw the soil in opposite directions, i. e., one forward pair of disks throws the soil in one ridge into the furrow on one side of the furrow being traversed by the runners and the other pair of disks throws soil from another ridge into the furrow on the opposite side of the furrow being traversed by the runners. The two rear pair of disks are adjustably mounted on opposite ends of a supporting bar or shaft and are arranged closer to the runners than the forward pairs of disks and set to throw the remaining soil in the two ridges on opposite sides of the furrow into said furrow, i. e., into the furrow being traversed by the runners. It follows that the correlation of the parts is such that in one travel of the implement the filling of the furrow traversed by the runners is accomplished by the rear disks, while the filling of the furrow on one side thereof is completed by one pair of forward disks and the filling of the furrow on the other side is commenced by the other pair of forward disks to be in turn completed in the next traverse of the implement.

This invention relates to improvements in ridge breakers of the double row type and has for its important purposes the removal of certain disadvantages thereof. In the accomplishment of the present purposes the runners, or other suitable means employed to support the implement, are so arranged that they traverse two furrows, one support in each furrow, in the same travel of the implement, and the furrow filling disks, or other means employed in lieu thereof, are so arranged that there will be complementary filling elements on opposite sides of the longitudinal line of each runner or support, the complementary filling elements associated with one runner co-operating to fill the furrow traversed by said runner or support, and the complementary filling elements associated with the other runner or support co-operating to fill the furrow traversed by the latter, all in the one operation or traverse of the implement. While I recognize the fact that any suitable support may be employed, I prefer to use runners for this purpose, and similarly while I recognize the fact that other styles of furrow filling elements than rotary disks may be employed to move the loose soil from the ridges into the furrows, yet I prefer to employ such disks for this purpose. When disks are employed as the furrow filling elements, the inside disks, i. e., those between the runners or supports, are so arragned that the disk or disks for throwing the soil into one furrow will be somewhat in advance of the corresponding disk or disks for throwing the soil into the other furrow, in order that their working surfaces may be so disposed that each can work up to and slightly beyond a longitudinal line between the runners and hence slightly beyond the center of the ridge, thereby taking all of the soil from the ridge, without interference one with another. Otherwise the center of the ridge would be left untouched, thereby depriving the furrows of soil required to fill the same properly and leaving an excess of soil in the space between the furrows.

Figure 3:
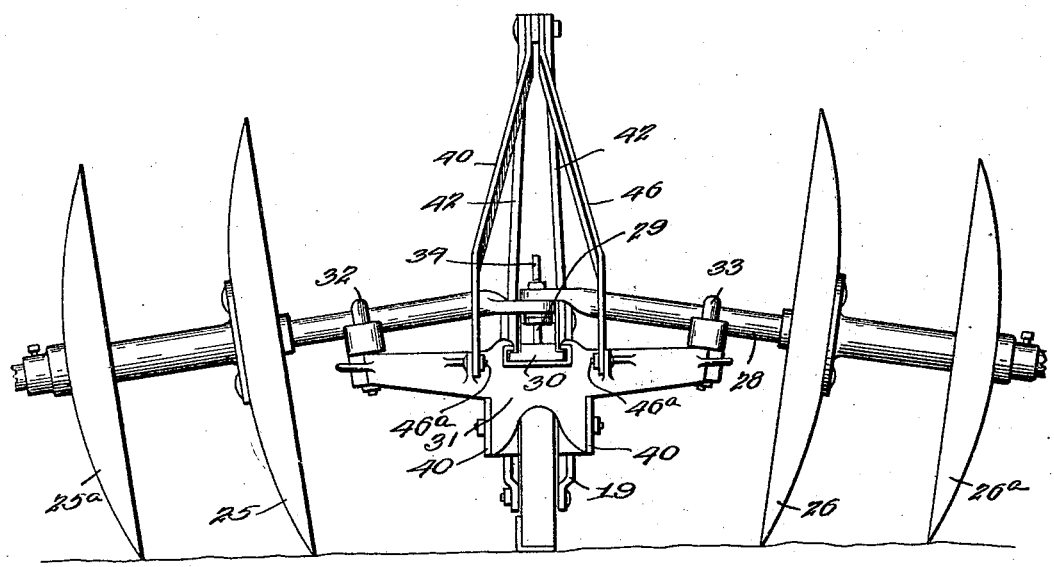

In the accompanying drawings, wherein like characters of reference denote corresponding parts in the several views:

Fig 1. is a plan view: Fig 2 is a side elevation: Fig 3 is a rear elevation of the means for filling one furrow, on a larger scale than Figs 1 and 2; Fig 4 is a transverse section on the line 4—4 Fig 1, on a larger scale than Fig 1, viewed from the front toward the rear.

The supports which I prefer to use are formed of two runners, marked 10 and 11 respectively, extending longitudinally of the implement. These runners are so spaced that one traverses one furrow and the other traverses the next adjacent furrow in the same travel of the implement. They are suitably connected with each other, the means employed for this purpose preferably consisting of a front transverse member 12 and a rear transverse member 13. The rear transverse member 13 is preferably employed to support the seat 14 which is thus disposed between the runners and consequently between the furrows, the standard 14$^a$ of the seat being in such case suitably connected at its lower end to the member 13 between the runners 10 and 11. The front transverse member should be such as to serve as crusher board, for breaking clods. It will be noted that the runners 10 and 11, crusher board 12 and member 13 constitute the frame of the implement and that this frame is adaptable to traverse two furrows and to support the elements by which both said furrows are filled at the same operation with the same number of runners heretofore required when both runners are arranged to traverse the same furrow in one travel of the implement. The transverse members 12 and 13 do not project beyond the sides of the runners to enable them to support the ridge breaking and furrow filling disks in position to act on ridges between the furrows traversed by the runners: in fact, the ridge breaking and furrow filling disks in the present embodiment are carried by the runners instead of by said members.

The connection between the runners 10 and the opposite ends of the transverse members 12 and 13 are preferably of such a nature that the distance between the runners may be varied to accord with the distance between the furrows within which they are to operate, it being understood that while these furrows are ordinarily about three feet apart, yet they need not be exactly that distance in all cases. A suitable means for permitting such adjustment of the runners and for holding them fixedly in their adjusted relation is shown in the drawing. The front transverse member 12 is illustrated as being secured to the runners by lag screws 15 whose stems extend through slots 16 in the member 12. The rear transverse member 13 is shown as having one of its ends secured to the adjacent runner (10) by brackets 17, 17$^a$, on opposite sides of the runner and U-bolts 18, the ends of the U-bolts being threaded and provided with nuts 18$^a$ which may be slackened to loosen the bolts. The other end of the transverse member 13 is shown as being mounted between laterally extending portions of brackets 19 and 20, and members 21 and 22. The brackets 19 and 20 are secured to opposite sides of the runner 11 and the members 21 and 22 are bolted to the brackets 19 and 20 and carry quadrants hereinafter described.

For filling the furrow traversed by the runner 10 I prefer to employ a plurality of discs 25 and 25$^a$ on one side of said runner and a like plurality of discs 26 and 26$^a$ on the other side of the runner; and for filling the furrow traversed by the runner 11, I employ a like series of disks 25, 25$^a$, 26, 26$^a$.

The respective pairs of disks 25 and 25$^a$ are preferably mounted to rotate upon shafts 27 and the respective pairs of disks 26 and 26$^a$ are similarly preferably mounted to rotate on shafts 28. The shafts 27 and 28 for one set of disks overlap each other preferably substantially in line with and rearward of the rear end of the runner 10 and similarly the shafts 27 and 28 of the other set of disks overlap each other preferably substantially in line with and rearward of the runner 11. The overlapping, inner, ends of each pair of shafts 27, 28 are pivoted upon a bolt or other suitable element 29 carried by a slidable member 30. Each member 30 traverses a groove in a block 31, having members which are pivoted thereto and are formed with eyes 32 and 33, through which the shafts 27 and 28 extend. (See Fig. 3). Each slidable member 30 is connected by a link 34, shown best in Fig. 1, with a lever 35 by which it is adjusted in the direction of the length of the runner, 10 or 11, to which it is applied. This adjustment changes the angular relation of the discs on opposite sides of the runner with respect to each other and to the runner, to suit the varying conditions which arise in the operation of these implements. To hold the slidable member and consequently the discs in adjusted position a quadrant 37 and latch 38 are employed. The latch 38 is connected with a handle 38$^a$ as usual in the implement art.

In order to adjust the depth of penetration of the disks into the ridge and to adjust them above the runners, the latter adjustment being a transport position, means are provided by which the blocks or members 31, respectively, with the elements carried thereby may be raised and lowered and held in various positions between their highest and lowest extremes. As these means are duplicates of each other, a description of one will suffice for both. A suitable means comprises arms 40, arranged longitudinally of and on opposite sides of the adjacent runner and extending rearwardly beyond the same. The front ends of these arms are mounted on a horizontal pivot, 41, (Fig. 2) and their rear ends are rigidly secured to the member 31 and firmly support said members. Uprights 42, pivoted at their lower ends on a horizontal axis indicated at 43, have their upper ends connected by a forwardly extending link 44 to an adjusting lever 45. The upper ends of the uprights are connected to the members 31 by rearwardly extending members 46 whose lower, rear, ends are pivoted to the member 31 at 46ª. The lever 45 carries a latch 47 having a handle 47ª, said latch engaging a quadrant 48. Thus when the lever 45 is moved forward the block or member 31 is elevated and when said lever is moved rearward the block or member 31 is lowered.

The mechanism for filling the furrow traversed by the runner 10 and the mechanism for filling the furrow traversed by the runner 11 may be of identical construction, but the inner disk 26ª of one runner, as 11 for example, is arranged in advance of the corresponding disk 26ª, of the other runner, and in such relation with respect to the central line of the ridge so as to leave no portion of the ridge between the runners untouched. The runner 11 in such case is shorter than the runner 10: in other words, its rear end terminates in advance of a transverse line intersecting the rear end of the runner 10.

In addition to the adjustment of the runners to accord with the space between the furrows within which they are to operate it is preferred to mount the disks so that they may be adjusted longitudinally of their respective supporting shafts 27 and 28. This adjustment may be provided in any suitable way.

It will be understood that the furrows within which the present runners are intended to operate are formed by a two row lister and hence while the distance between furrows may be regulated, the distance to which they have been regulated will be maintained and accordingly the present implement when its runners have been adjusted in accord with the adjustment to which the lister bottoms were set, will always traverse the furrows and the disks will be maintained in such relation to the furrows that the complete removal of the ridges and the proper filling of the furrows will thereby be assured. There are other important advantages following the particular construction herein described as will be apparent to those familiar with the art. In a general way it is stated that the construction is simple, durable and may be easily adjusted and operated with a minimum of power.

Having thus described the invention, what I believe to be new and desire to secure by Letters Patent, is:—

1. In a multiple ridge breaker designed for levelling listed ground, a frame comprising a plurality of supporting elements adapted to travel in adjacent valleys between ridges, and earth moving elements carried laterally to either side of said supporting elements for completely filling the valleys traversed by said supporting elements, the earth moving elements operating upon the straddled ridge being out of transverse alignment.

2. In a multiple ridge breaker for levelling listed ground, a frame comprising supporting elements adapted to travel in adjacent valleys between ridges, and cross members adapted to hold said supporting elements rigidly spaced apart, and earth moving elements carried by each of said supporting elements laterally of both sides thereof and designed to move earth from adjacent ridges to completely fill the valley traversed by said supporting element, the earth moving elements operating upon adjacent straddled ridges being out of transverse alignment.

3. In a multiple ridge breaker for levelling listed ground, a frame comprising supporting elements of varying length adapted to travel in the valleys between ridges and cross members holding said supporting elements rigidly spaced apart, and earth moving elements carried laterally to each side of each of said supporting elements to move earth from adjacent ridges to completely fill the valley traversed by said supporting element, the earth moving elements between the supporting elements being staggered, whereby intermediate ridges are operated upon successively and completely reduced to a level condition.

4. In a multiple ridge breaker designed for levelling listed ground, a pair of runners, one of which is longer than the other, means for holding them rigidly in spaced relation comprising a ridge capping plate, and ridge levelling elements carried by said runners.

5. In a multiple ridge breaker designed for levelling listed ground, a pair of runners, one of which is longer than the other, means for connecting them rigidly in spaced relation comprising a ridge capping plate extending laterally thereof, ridge breaking elements supported to the rear and laterally of said runners comprising revolving disks.

In testimony whereof I affix my signature.

CHARLES T. RAY.